US008583171B2

(12) United States Patent
Sakai (10) Patent No.: US 8,583,171 B2
(45) Date of Patent: Nov. 12, 2013

(54) COMMUNICATION APPARATUS, CONTROL METHOD OF COMMUNICATION APPARATUS, AND PROGRAM

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/156,206

(22) Filed: Jun. 8, 2011

(65) Prior Publication Data

US 2011/0306373 A1    Dec. 15, 2011

(30) Foreign Application Priority Data

Jun. 15, 2010  (JP) ................. 2010-136311

(51) Int. Cl.
*H04M 1/00* (2006.01)
*H04W 88/06* (2009.01)
(52) U.S. Cl.
USPC .......... 455/552.1; 455/550.1; 455/67.11; 455/425
(58) Field of Classification Search
USPC ......... 455/410, 411, 517, 415, 425, 434, 515, 455/62, 67.11, 550.1, 90.2, 551, 552.1, 455/554.2, 41.1, 41.2; 370/338, 395.2, 254
See application file for complete search history.

(56) References Cited

U.S. PATENT DOCUMENTS

| | | | | |
|---|---|---|---|---|
| 2002/0147819 | A1* | 10/2002 | Miyakoshi et al. | 709/228 |
| 2005/0054326 | A1* | 3/2005 | Rogers | 455/410 |
| 2007/0088951 | A1* | 4/2007 | Nakajima | 713/171 |

FOREIGN PATENT DOCUMENTS

| | | |
|---|---|---|
| CN | 1953614 A | 4/2007 |
| CN | 101572926 A | 11/2009 |
| WO | 00/72506 A1 | 11/2000 |
| WO | 2009/014014 A | 1/2009 |
| WO | 2009/150777 A | 12/2009 |

OTHER PUBLICATIONS

Wi-Fi Certified(TM) for Wi-Fi Protected Setup: Easing the User Experience for Home and Small Office Wi-Fi(R) Networks, http://www.wi-fi.org/wp/wifi-protected-setup.
Cynthia Kuo, Jesse Walker, and Adrian Perrig, "Low-cost Manufacturing, Usability, and Security: An Analysis of Bluetooth Simple Pairing and Wi-Fi Protected Setup", pp. 1-15, XP055025816.

* cited by examiner

*Primary Examiner* — John J Lee
(74) *Attorney, Agent, or Firm* — Canon U.S.A., Inc. IP Division (57) ABSTRACT

A communication apparatus capable of performing setting processing of a plurality of methods for sharing with other communication apparatuses communication parameters to be used in communication with the other communication apparatuses detects that setting processing is activating in each of a plurality of other communication apparatuses, and if at least one of methods of detected setting processing activated in the plurality of other communication apparatuses is an identification method in which a user identifies another communication apparatus sharing the communication parameters, activates the setting processing of the identification method.

24 Claims, 8 Drawing Sheets

COMMUNICATION APPARATUS, CONTROL METHOD OF COMMUNICATION APPARATUS, AND PROGRAM

BACKGROUND OF THE INVENTION

1. Field of the Invention

The present invention relates to a process for setting communication parameters.

2. Description of the Related Art

Recently, there are various methods for easily acquiring and setting communication parameters necessary for performing wireless communication in which security is ensured. Such communication parameters include service set identifier (SSID), an encryption method, an encryption key, an authentication method, an authentication key, and the like. For example, "Wi-Fi Certified (trademark) for WI-FI Protected Setup: Easing the User Experience for Home and Small Office Wi-Fi (R) Networks (http://www.wi-fi.org/wp/wifi-protected-setup)" discusses a personal identification number (PIN) method in which an access point (AP) that provides the communication parameters is identified based on a PIN code input to the AP, and then the communication parameters are acquired from the identified AP. Further, the above-described reference literature discusses a push button configuration (PBC) method in which the communication parameters are acquired from the AP by a user pressing a predetermined button on the AP. In addition, various manufactures provides different types of setting methods.

If a target apparatus corresponds to the various types of setting methods, the communication parameters can be set by the user selecting the setting method to be used in setting of the communication parameters. US Patent Application Publication No. 2007/0088951 discusses a configuration in which a target apparatus performs a setting method which is being activated in surrounding apparatuses, so that the communication parameters are set without the user selecting the setting method.

However, if a plurality of apparatuses is activating a plurality of setting methods that are executable by the target apparatus, the target apparatus does not automatically select the setting method to be executed from the plurality of setting methods. Further, if the user is to select the setting method from the plurality of setting methods, it is necessary for the user to determine and select the appropriate setting method, so that it is not user-friendly.

SUMMARY OF THE INVENTION

The present invention is directed to a technique capable of facilitating setting processing in the case where an identification method for identifying another communication apparatus that provides the communication parameters is activated based on a user operation performed after the communication parameter setting processing is activated, even when a plurality of apparatuses is activating a plurality of setting methods.

According to an aspect of the present invention, a communication apparatus capable of performing setting processing of a plurality of methods for sharing with other communication apparatuses communication parameters to be used in communication with the other communication apparatuses, includes a detection unit configured to detect a plurality of methods for setting processing activated in a plurality of apparatuses, a determination unit configured to determine whether at least one of the plurality of methods for setting processing detected by the detection unit is an identification method for identifying an apparatus that provides the communication parameters based on a user operation after setting processing of the communication parameters is activated, and a selection unit configured to select, if the determination unit determines that at least one of the plurality of methods for setting processing detected by the detection unit is the identification method, the setting processing of the communication parameters by the identification method.

According to the present invention, if the identification method for identifying another communication apparatus that provides the communication parameters is activated based on the user operation performed after the communication parameter setting processing is activated, the setting processing can be easily performed even when the plurality of apparatuses is activating the plurality of setting methods.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

According to a first exemplary embodiment, a wireless local area network (LAN) system complying with Institute of Electrical and Electronics Engineers (IEEE) 802.11 series will be described as an example. However, a communication configuration is not limited to the wireless LAN system complying with IEEE 802.11 series. Communication may be performed using other wireless media, such as ultra wide band (UWB), multiband orthogonal frequency division multiplexing (OFDM) alliance (MBOA), Bluetooth (registered trademark), and ZigBee. UWB includes wireless universal serial bus (USB), wireless 1394, WiMedia network (WI-NET), and the like. Further, communication may be performed using wired communication media such as a wired LAN.

Figure 1:
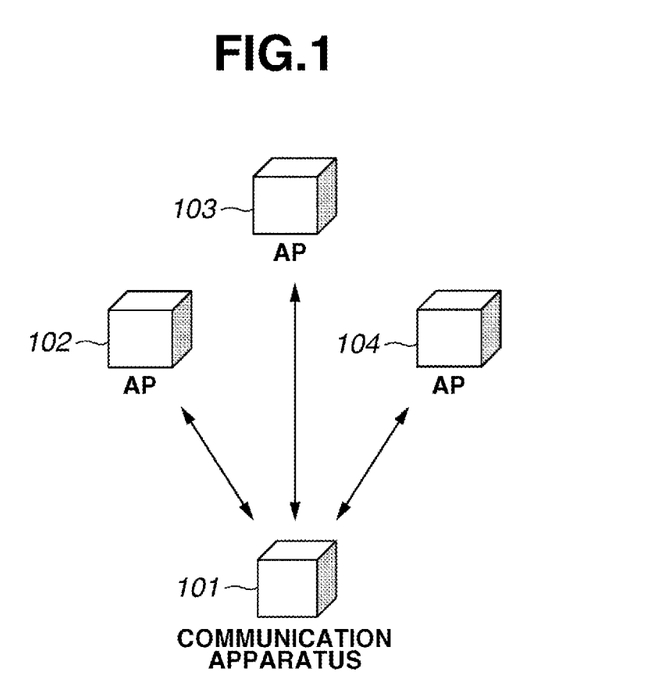
FIG. 1 illustrates a system configuration according to an exemplary embodiment of the present invention.

FIG. 1 illustrates a system configuration according to the present exemplary embodiment. Referring to FIG. 1, a communication apparatus (i.e., a station) 101 acquires from an access point (AP) the communication parameters necessary for performing wireless communication, and performs setting processing for sharing the communication parameters with the AP. The communication parameters includes the SSID, i.e., a network identifier, an encryption method, an encryption key, an authentication method, an authentication key, and the like. APs 102, 103, and 104 are providing apparatuses that provide the communication parameters to the station.

The AP, i.e., the providing apparatus, transmits the communication parameters to the communication apparatus 101, and the communication apparatus 101 performs the setting processing of the acquired communication parameters, so that the AP and the communication apparatus share the communication parameters. Accordingly, the AP and the communication apparatus can perform wireless communication in which security is ensured.

There is a plurality of methods for performing the setting processing (i.e., setting methods) for sharing the communication parameters between the AP and the communication apparatus. For example, there is a method in which the AP that provides the communication parameters is identified by confirming identification information (e.g., the PIN code) that the user has input to the AP and the communication apparatus thus shares the communication parameters with the identified AP. Hereinafter, such a method is referred to as an identification method. More specifically, the user inputs to the AP the PIN code that the communication apparatus (i.e., station) presents to the user. In such a case, the communication apparatus generates the PIN code at random and presents the PIN code to the user by displaying it on a display screen. However, the presentation method is not a limited to this example. In order to present the PIN code to the user, the communication apparatus may display a predetermined PIN code on the display screen, or the predetermined PIN code may be attached to the communication apparatus main body.

Further, the communication apparatus may print the randomly generated PIN code or the predetermined PIN code to present it to the user. Furthermore, the AP transmits information about the PIN code to the communication apparatus, and the communication apparatus compares the PIN code presented to the user with the PIN code transmitted from the AP. Thus, the AP, i.e., the providing apparatus which provides the communication parameters can be identified. In other words, the AP that has transmitted the same PIN code as the PIN code that the communication apparatus presents to the user can be identified as the providing apparatus which provides the communication parameters.

According to the present exemplary embodiment, the above-described setting method in which the PIN code is input to the AP will be referred to as the PIN method. Further, according to the present exemplary embodiment, the user inputs the PIN code to the AP after the user activates the setting processing of the PIN method in the AP, i.e., the providing apparatus. After the user has input the PIN code to the AP, the AP notifies the communication apparatus (i.e., the station) that the PIN method is being activated.

In another identification method, the user presses predetermined buttons in both the AP and the communication apparatus (i.e., the station) to activate the communication parameters setting processing. The user then re-presses the predetermined button in the AP after the setting processing is activated. Further the AP notifies the communication apparatus that the predetermined button has been pressed again in the AP, so that the communication apparatus identifies the AP as the providing apparatus. As described above, according to the identification method, the station acquires the communication parameters from the AP which is identified as the providing apparatus based on the user operation after the setting processing is activated.

Further, there is a method in which the station acquires, when the station detects the AP in which the predetermined button has been pressed, the communication parameters from the detected AP without the user performing the operation after the setting processing is activated. Hereinafter, such a method will be referred to as a non-identification method. There are various non-identification methods provided by standards groups and manufacturers.

Procedures and messages used in the setting processing performed between the AP and the station are different for each of the above-described setting methods. The communication parameters thus cannot be shared unless the AP and the station perform the same setting method.

According to the present exemplary embodiment, the AP 102 can perform the setting processing according to a first identification method (i.e., an identification method A), and a first non-identification method (i.e., a non-identification method A). Further, the AP 103 can perform the setting processing according to a second identification method (i.e., an identification method B) that is different from the first identification method, and a second non-identification method (i.e., a non-identification method B) that is different from the first non-identification method. Furthermore, the AP 104 can perform the setting processing according to the non-identification method A. Moreover, the communication apparatus 101 can perform the setting processing according to the identification methods A and B, and the non-identification methods A and B.

Figure 2:
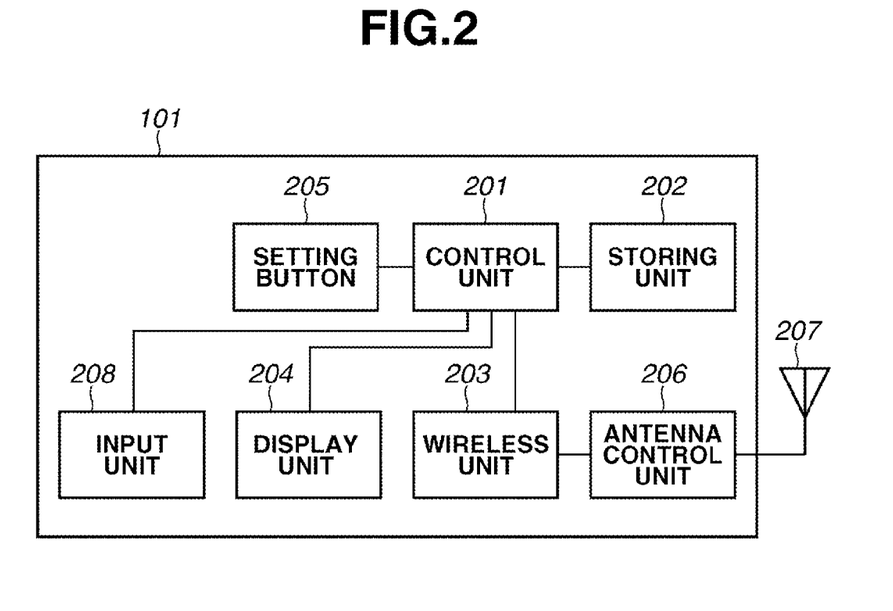
FIG. 2 illustrates a hardware configuration according to the exemplary embodiment.

FIG. 2 illustrates a hardware configuration of the communication apparatus 101. Referring to FIG. 2, a control unit 201 collectively controls the communication apparatus 101 by executing a control program stored in a storing unit 202. The control unit 201 is a computer such as a central processing unit (CPU) or a microprocessor unit (MPU). The control unit 201 also controls a communication parameter automatic setting system which is performed with other apparatuses.

The storing unit 202 stores computer programs for control executed by the control unit 201 and various information pieces such as the communication parameters. The various operations to be described below are performed by the control unit 201 executing the control program stored in the storing unit 202. The storing unit 202 may be a memory such as a read-only memory (ROM) and a random access memory (RAM), a flexible disk, a hard disk, an optical disk, a magneto-optical disk, a compact disk (CD)-ROM, a CD-read (R), a magnetic tape, a non-volatile memory card, and a digital versatile disk (DVD).

A wireless unit 203 performs wireless communication. A display unit 204 performs various displays and has functions for outputting information that can be visually recognized, such as in a liquid crystal display (LCD) and a light-emitting diode (LED) and for outputting sound, such as in a speaker. A setting button 205 applies a trigger for starting a process of the communication parameter automatic setting system. The setting button 205 may be configured as hardware, or may be displayed on the display unit 204 as a selection item by software control. Upon detecting that the user has operated on the setting button 205, the control unit 201 performs the process to be described below. The communication apparatus 101 further includes an antenna control unit 206, an antenna 207, and an input unit 208 for the user to perform various inputs.

Figure 3:
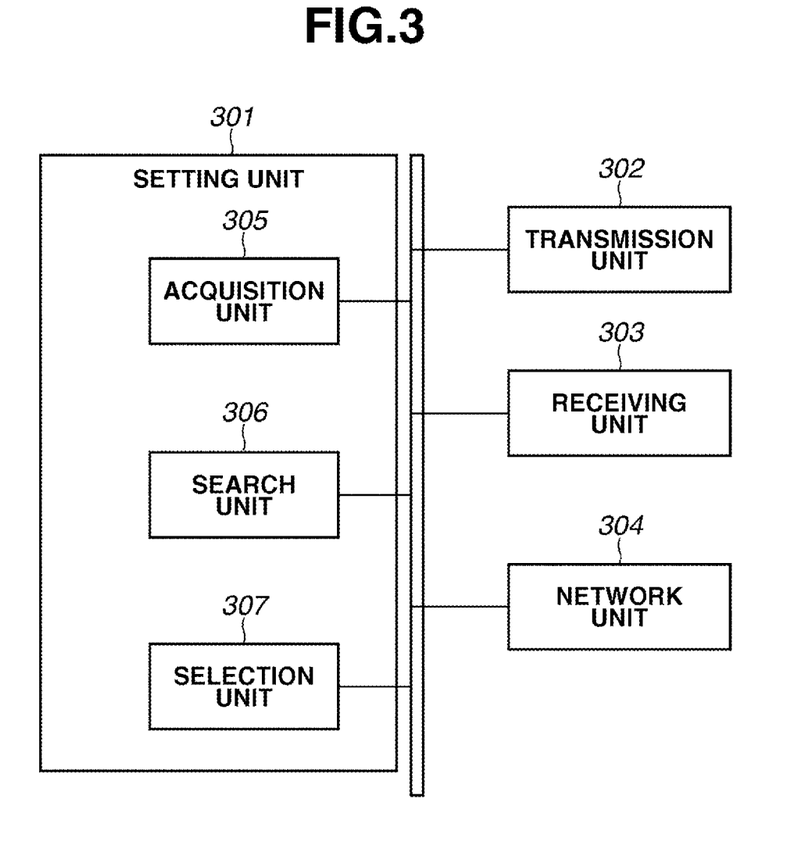
FIG. 3 is a block diagram illustrating software functions according to the exemplary embodiment.

FIG. 3 is a block diagram illustrating software functions realized by the control unit 201 in the communication apparatus 101 reading the program stored in the storing unit 202, for performing the communication parameter automatic setting process to be described below. Referring to FIG. 3, a setting unit 301 performs automatic setting of the communication parameters that are necessary for performing wireless communication. The setting unit 301 controls various protocols in the communication parameter automatic setting processing, and automatically sets the communication parameters. A transmission unit 302 transmits packets to be used in various types of communication. The transmission unit 302 transmits a probe request, i.e., a network search signal for searching the network.

A receiving unit 303 receives the packets used in various types of communication. The receiving unit 303 receives, for example, a beacon (i.e., an annunciation signal) or a probe response (i.e. a search response signal) from other communication apparatuses. The probe response is a response signal with respect to the probe request. Various types of information about a transmission source device (i.e., self information) are added to the probe request, the probe response, and the beacon. The self information includes information indicating that the apparatus is being activated as the providing apparatus that provides the communication parameters (i.e., an activating flag), and information indicating the activating automatic setting method (i.e., setting method information). Further, the self information includes unique identification information such as a media access control (MAC) address for identifying the transmission source device.

A network unit 304 controls connection to the network, and performs connection processing to the wireless LAN network. An acquisition unit 305 acquires the communication parameters from the providing apparatus. A search unit 306 searches for the providing apparatus when performing the communicate parameter automatic setting. A selection unit 307 selects the setting method to be performed.

Figure 4:
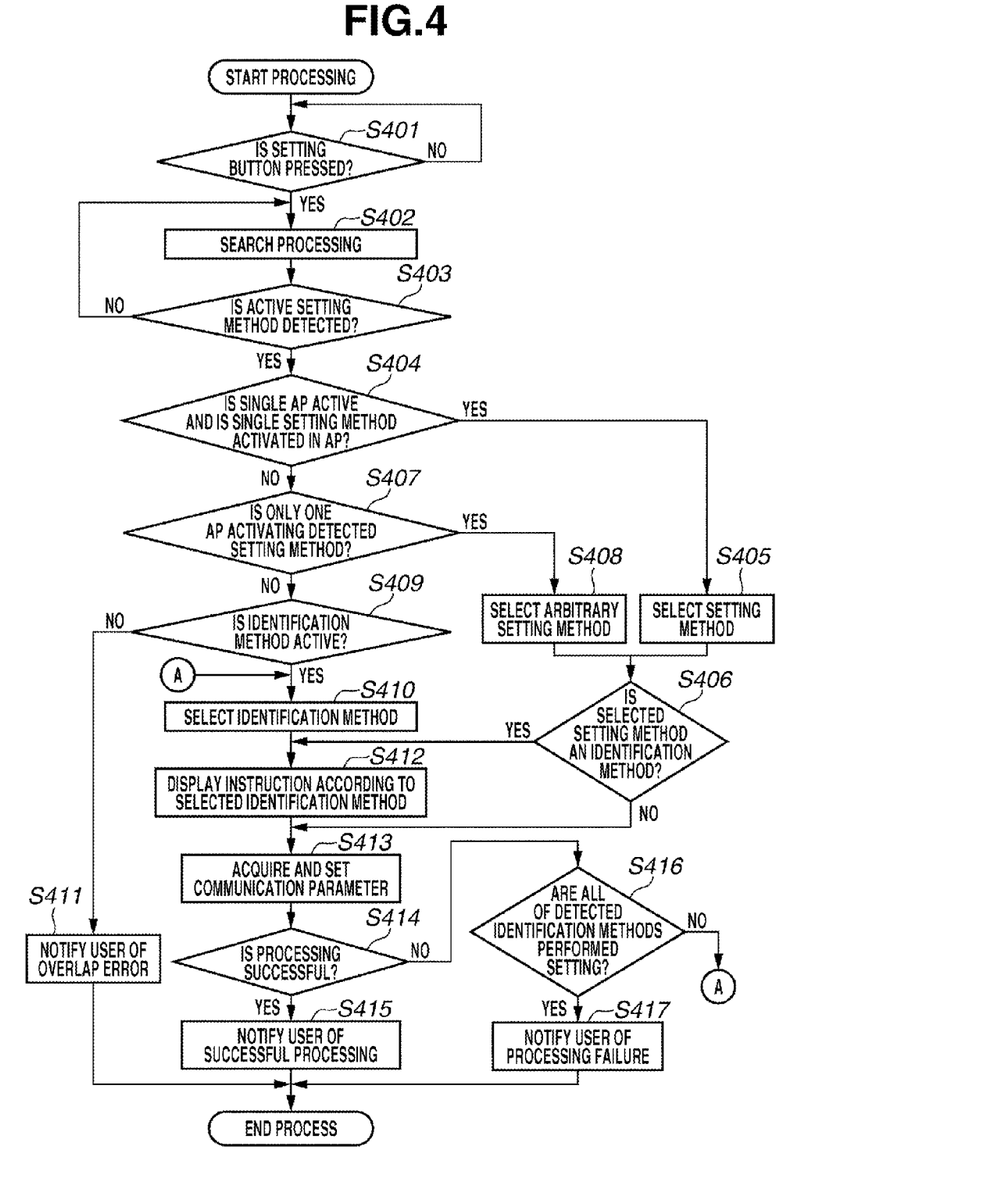
FIG. 4 is a flowchart illustrating a process performed by a communication apparatus according to the exemplary embodiment.
Figure 5A:
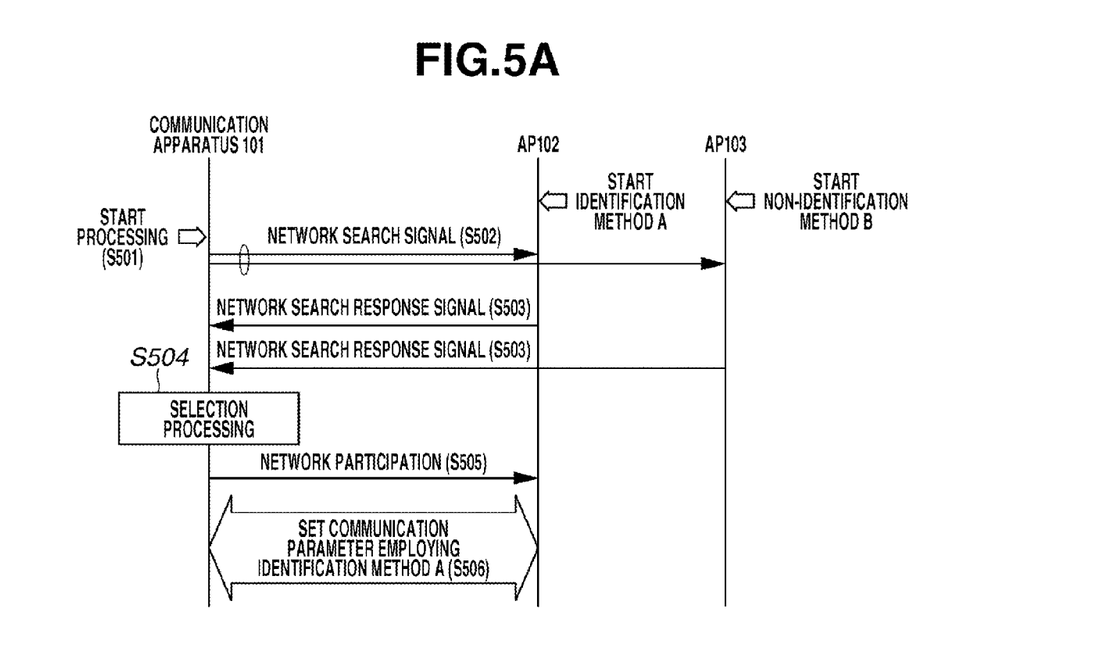
FIGS. 5A, 5B, and 5C are sequence charts corresponding to the flowchart illustrated in FIG. 4.

FIG. 4 is a flowchart illustrating a process realized, when the user has pressed the setting button 205, by the control unit 201 in the communication apparatus 101 reading the computer program stored in the storing unit 202. According to the present exemplary embodiment, the setting processing of the identification method A is activated in the AP 102, and the setting processing of the non-identification method B is activated in the AP 103. The setting processing is not activated in the AP 104. FIG. 5A illustrates a process sequence chart according to the above-described status. Hereinafter, the state in which the setting processing of the identification method A is activated will be referred to as a state in which the identification method A is activated. Similarly, the state in which the setting processing of the non-identification method B is activated will be referred to as a state in which the non-identification method B is activated.

In step S401 illustrated in FIG. 4 and step S501 illustrated in FIG. 5, the setting unit 301 monitors whether the user has pressed the setting button 205. If the setting unit 301 detects that the user has pressed the setting button 205 (YES in step S401), the process proceeds to step S402 and step S502. In step S502, the search unit 306 transmits the probe request, i.e., the network search signal using the transmission unit 302. In this step, the search unit 306 transmits the probe request in each of all frequency channels.

In step S402 and step S503, the search unit 306 uses the receiving unit 303 to receive the probe response and acquires the information about the surrounding APs. The information about the surrounding APs may also be acquired by the search unit 306 using the receiving unit 303 to receive the beacon. Here, upon receiving the probe request from the communication apparatus 101, the AP 102 transmits to the communication apparatus 101 the prove response including the self information indicating that the AP 102 is activating the identification method A. Further, upon receiving the probe request from the communication apparatus 101, the AP 103 transmits to the communication apparatus 101, the prove response including the self information indicating that the AP 103 is activating the non-identification method B.

In step S403, the search unit 306 confirms the self information included in the received probe response and detects the setting method being activated in the AP. If no active setting methods is detected (NO in step S403), the process returns to step S402, and the search unit 306 again performs the search process.

According to the present exemplary embodiment, two setting methods, i.e., the identification method A activated in the AP 102 and the non-identification method B activated in the AP 103, are detected (YES in step S403), so that the process proceeds to step S404. If the self information is included in the beacon transmitted from the AP, the search unit 306 confirms the self information included in the beacon and detects the setting method activated in the AP.

In step S404, the selection unit 307 confirms whether the setting method is activated in only one AP, and whether the AP is activating only one setting method. If the setting method is activated in only one AP, and the AP is activating only one setting method (YES in step S404), the process proceeds to step S405. If not (NO in step S404), the process proceeds to step S407.

In step S405, the selection unit 307 selects the detected setting method. In step S406, the selection unit 307 determines whether the selected setting method is the identification method. If the selected setting method is the identification method (YES in step S406), the process proceeds to step S412. In step S412, the setting unit 301 uses the display unit 204 to notify the user of an instruction according to the selected identification method. For example, if the selected identification method is the PIN method, the display unit 204 displays that the communication apparatus is connected to the AP by employing the PIN method.

If the user has not inputted the PIN code to the AP and the PIN method has been selected, the display unit 204 displays the PIN code and instructs the user to input the displayed PIN code to the AP. If the selected identification method is another method, the display unit 204 instructs the user to operate (e.g., press a button on) the AP that is to provide the communication parameters. In step S413, the acquisition unit 305 participates in the network constituted by the AP activating the selected setting method, and performs the communication parameter setting processing using the selected setting method.

On the other hand, if the selected setting method is not the identification method (i.e., the non-identification method) (NO in step S406), the process proceeds to step S413. In step S413, the acquisition unit 305 performs the communication parameter setting processing using the selected setting method. At this time, the display unit 204 notifies the user that the communication parameters are being set.

In step S407, the selection unit 307 determines whether only one AP is activated the detected setting methods. If there is only one AP activating the detected setting methods (YES in step S407), the process proceeds to step S408. If not (NO in step S407), the process proceeds to step S409. The selection unit 307 determines whether there is only one AP activating the setting methods by confirming the MAC address included in the probe response.

Here, since it is detected that the identification method A is activated in the AP 102 and the non-identification method B is activated in the AP 103, the selection unit 307 determines in step S407 that the there is more than one AP activating the detected setting methods. Accordingly, the process proceeds to step S409.

In step S408, the selection unit 307 selects an arbitrary method from the detected setting methods. If both the identification method and the non-identification method are detected, the selection unit 307 preferentially selects the non-identification method. Accordingly, the setting processing can be performed without requesting the user to perform an operation, so that a processing load on the user is reduced.

The process then proceeds to step S406. In step S406, the selection unit 307 determines whether the selected setting method is the identification method. If the selected setting method is the identification method (YES in step S406), the process proceeds to step S412. In step S412, the display unit 204 notifies the user of the instruction according to the selected identification method. In step S413, the acquisition unit 305 performs the communication parameter setting processing using the selected setting method. If the selected setting method is the non-identification method (NO in step S406), the process proceeds to step S413. In step S413, the acquisition unit 305 performs the communication parameter setting processing using the selected setting method.

On the other hand, if the detected setting method is activated on the different APs (NO in step S407), the process proceeds to step S409. In step S409, the selection unit 307 confirms whether the identification method is included in the detected setting methods. If the identification method has not been detected (NO in step S409), the selection unit 307 determines that the non-identification method is activated at the same time in a plurality of APs, and notifies the setting unit 301 on an overlap error. In step S411, the setting unit 301 uses the display unit 204 to notify the user of the overlap error. Upon notifying the user of the error, the process in the flowchart illustrated in FIG. 4 ends.

If the identification method has been detected (YES in step S409), the process proceeds to step S410. In step S410, the selection unit 307 selects the detected identification method. If a plurality of identification methods is detected, the selection unit 307 selects an arbitrary identification method. Here, the AP 102 is activating the identification method A, so that in step S504, the selection unit 307 selects the identification method A.

In step S412, the display unit 204 notifies the user of the instruction according to the selected identification method. In step S413, the acquisition unit 305 performs the communication parameter setting processing using the selected setting method. In step S505, the acquisition unit 305 participates in the network constituted by the AP 102. In step S506, the acquisition unit 305 notifies the user of the instruction according to the identification method A, acquires the communication parameters from the AP 102 using the identification method A, and sets the communication parameters.

In step S414, the setting unit 301 confirms whether the communication parameter setting processing performed by the acquisition unit 305 is successful. If the processing is successful (YES in step S414), the process proceeds to step S415. In step S414 and step S506, the setting unit 301 notifies the user via the display unit 204 that the processing is successful. Upon notifying the user, the process in the flowchart illustrated in FIG. 4 ends.

If the processing has failed (NO in step S414), the process proceeds to step S416. In step S416, the setting unit 301 confirms whether the acquisition and setting of the communication parameters have been performed for all of the detected identification methods. The processing may fail, for example, in the case where the AP is not determined as the providing apparatus selected by the user as a result of referring to the identification information (i.e., the PIN code) input to the AP.

If there is any identification method that has not tried the acquisition and setting of the communication parameters (NO in step S416), the process returns to step S410. Then, the acquisition of the communication parameters is tried using the identification method which has not tried the acquisition and setting of the communication parameters. If the acquisition of the communication parameters has been tried for all providing apparatuses (YES in step S416), the process proceeds to step S417. In step S417, the display unit 204 notifies the user of the processing failure (error). The process in the flowchart illustrated in FIG. 4 thus ends.

The process may return to step S402 to perform the search process, and if the search unit 306 then finds a newly activated setting method, the process may proceed to step S404. In such a case, if the newly activated setting method is not found even when a predetermined time has elapsed from the user pressing the setting button 205 in step S401, the display unit 204 notifies the user of the processing failure. The process in the flowchart illustrated in FIG. 4 thus ends.

As described above, even in an environment in which a plurality of automatic setting methods is performed, if the identification method for confirming a device selected by the user is being performed, the communication apparatus can perform the communication parameter automatic setting processing with the device selected by the user.

Figure 5B:
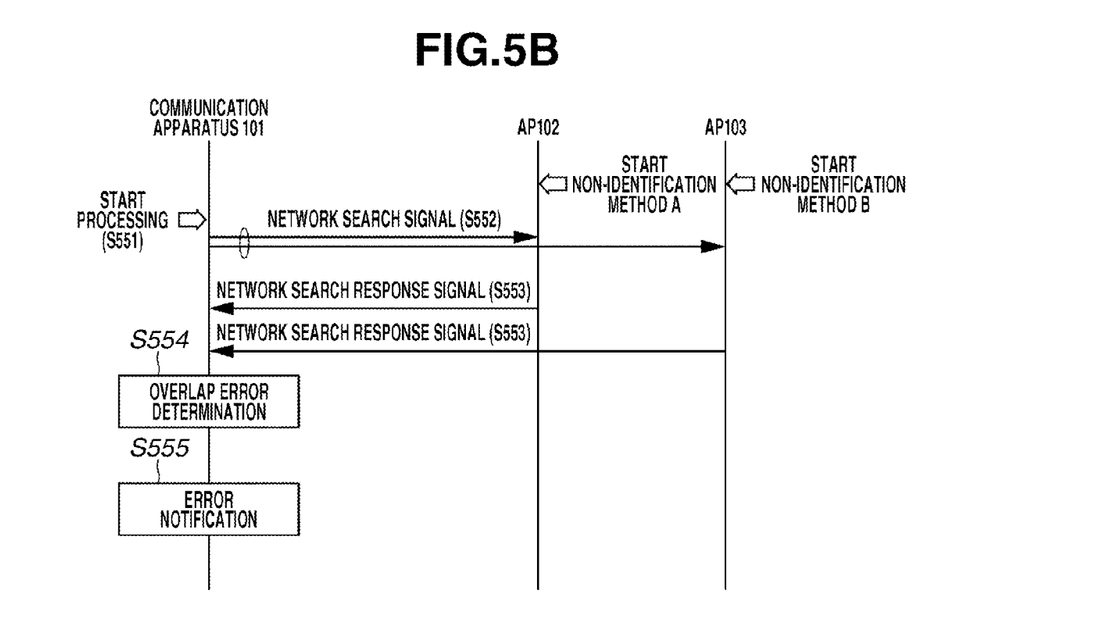

FIG. 5B is a sequence chart illustrating a case where the non-identification method A is activated in the AP 102, the non-identification method B is activated in the AP 103, and no setting processing is activated in the AP 104. The communication apparatus 101 operates according to the flowchart illustrated in FIG. 4.

In step S551, the user presses the setting button 205 in the communication apparatus 101. In step S552, the communication apparatus 101 then transmits the probe request, i.e., the network search signal, to search for the AP activated as the providing apparatus in the vicinity.

In step S553, upon receiving the probe request from the communication apparatus 101, the AP 102 transmits to the communication apparatus 101 the probe response including the self information indicating that the AP 102 is activating the non-identification method A. Further in step S553, upon receiving the probe request from the communication apparatus 101, the AP 103 transmits to the communication apparatus 101 the probe response including the self information indicating that the AP 103 is activating the non-identification method B.

In step S554, the communication apparatus 101 determines that the overlap error occurs (i.e., NO in step S410 in FIG. 4) based on the self information included in the received probe response. Then in step S555 and step S411, the communication apparatus 101 notifies the user of the overlap error.

As described above, if a plurality of non-identification methods is being executed, the user is notified of the error, and the process ends without setting the communication parameters. As a result, the communication parameter automatic setting processing can be prevented from being performed with an unintended device.

Figure 5C:
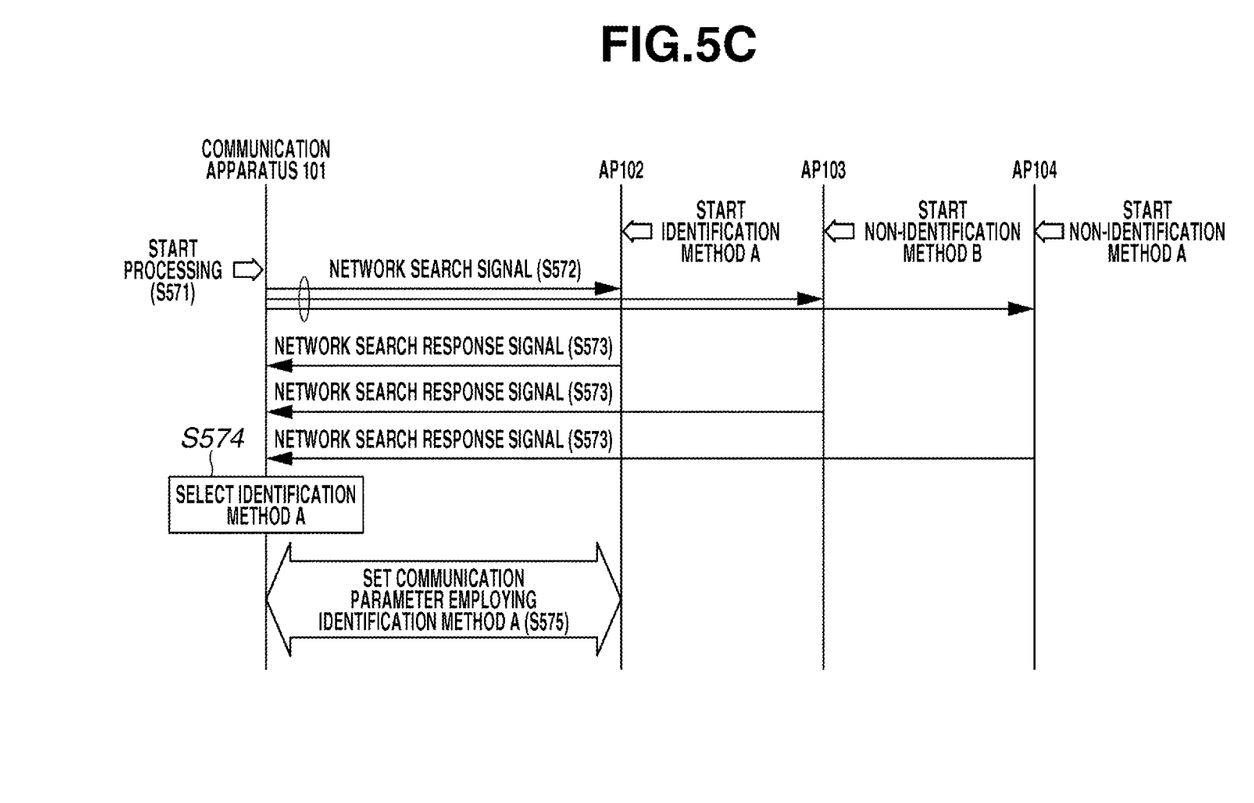

FIG. 5C is a sequence chart illustrating a case where the identification method A is activated in the AP 102, the non-identification method B is activated in the AP 103, and the non-identification method A is activated in the AP 104. The communication apparatus 101 operates according to the flowchart illustrated in FIG. 4.

In step S571, the user presses the setting button 205 in the communication apparatus 101. In step S572, the communication apparatus 101 then transmits the probe request, i.e., the network search signal, to search for the AP activated as the providing apparatus in the vicinity.

In step S573, upon receiving the probe request from the communication apparatus 101, the AP 102 transmits to the communication apparatus 101 the prove response including the self information indicating that the AP 102 is activating the identification method A. Further, upon receiving the probe request from the communication apparatus 101, the AP 103 transmits to the communication apparatus 101 the probe response including the self information indicating that the AP 103 is activating the non-identification method B. Furthermore, upon receiving the probe request from the communication apparatus 101, the AP 104 transmits to the communication apparatus 101 the probe response including the self information indicating that the AP 104 is activating the non-identification method A.

The communication apparatus 101 then detects that the identification method is activated (i.e., YES in step S409). In step S574 and step S410, the communication apparatus 101 selects the identification method A activated in the AP 102. In step S575 and step S413, the communication apparatus 101 thus uses the identification method A and performs the communication parameter setting processing.

As described above, if the identification method is performed when a plurality of non-identification methods is also performed, the communication parameter setting processing is performed using the activating identification method without determining that the overlap error has occurred. Accordingly, the identification method can be performed without requiring the user to select the communication parameter setting method.

According to the present exemplary embodiment, if a plurality of identification methods is activated, each of the plurality of identification methods is sequentially tried. However, the processing is not limited to this example, and only one identification method may be tried. Accordingly, complexity in notifying the user can be reduced. In particular, it is effective in a case where different information is to be notified for each identification method.

According to the first exemplary embodiment, if the different devices are executing different identification methods, only the identification methods are sequentially tried. According to a second exemplary embodiment, the non-identification method is tried when processing using the identification method has failed.

The system configuration, the hardware configuration of the communication apparatus 101, and the software functional blocks according to the second exemplary embodiment are similar to those described in the first exemplary embodiment. Description will thus be omitted. The configurations similar to those in the first exemplary embodiment will be described by assigning the same reference numerals.

Figure 6A:
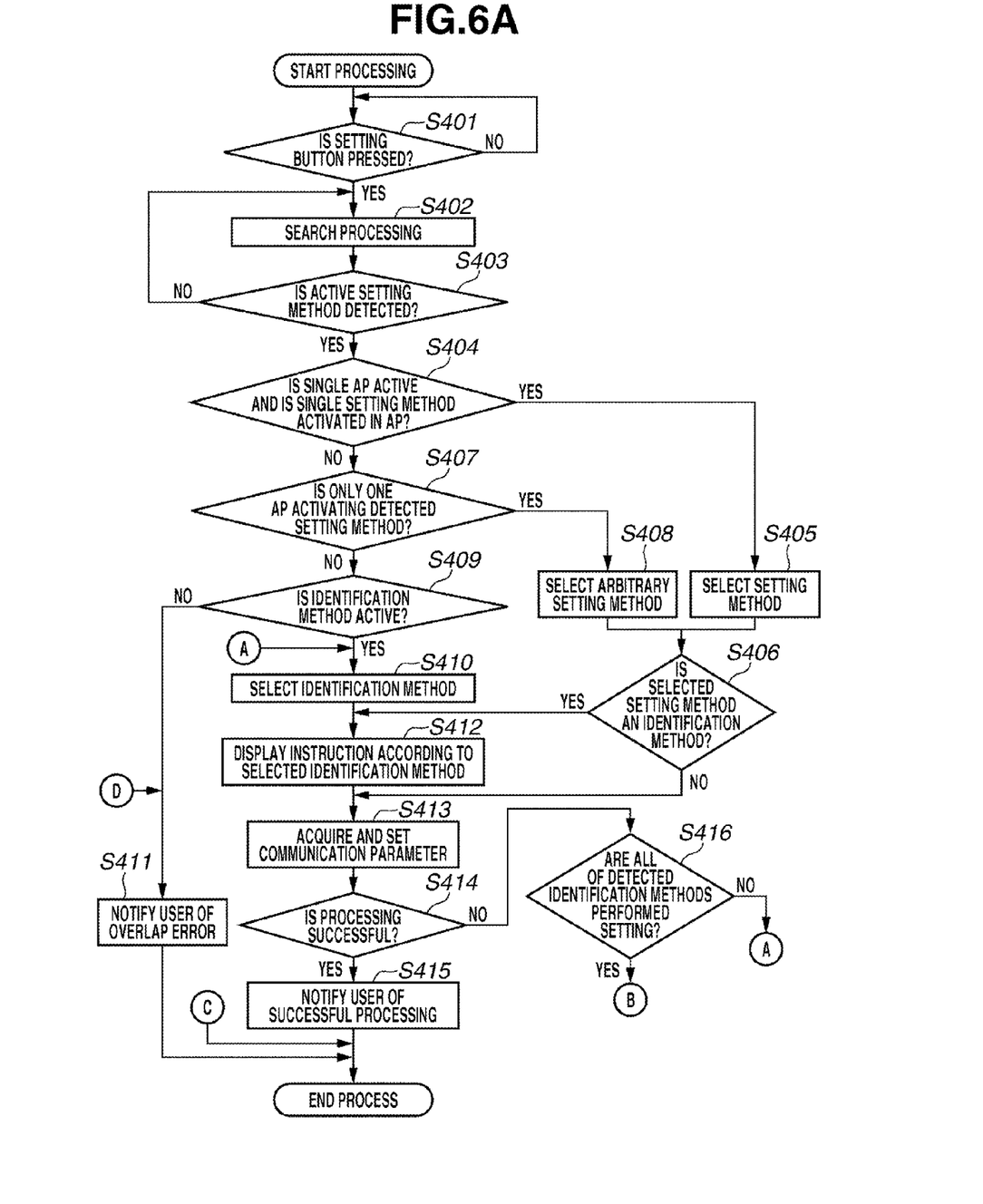
FIGS. 6A and 6B are a flowchart of a process performed by the communication apparatus according to the exemplary embodiment.
Figure 6B:
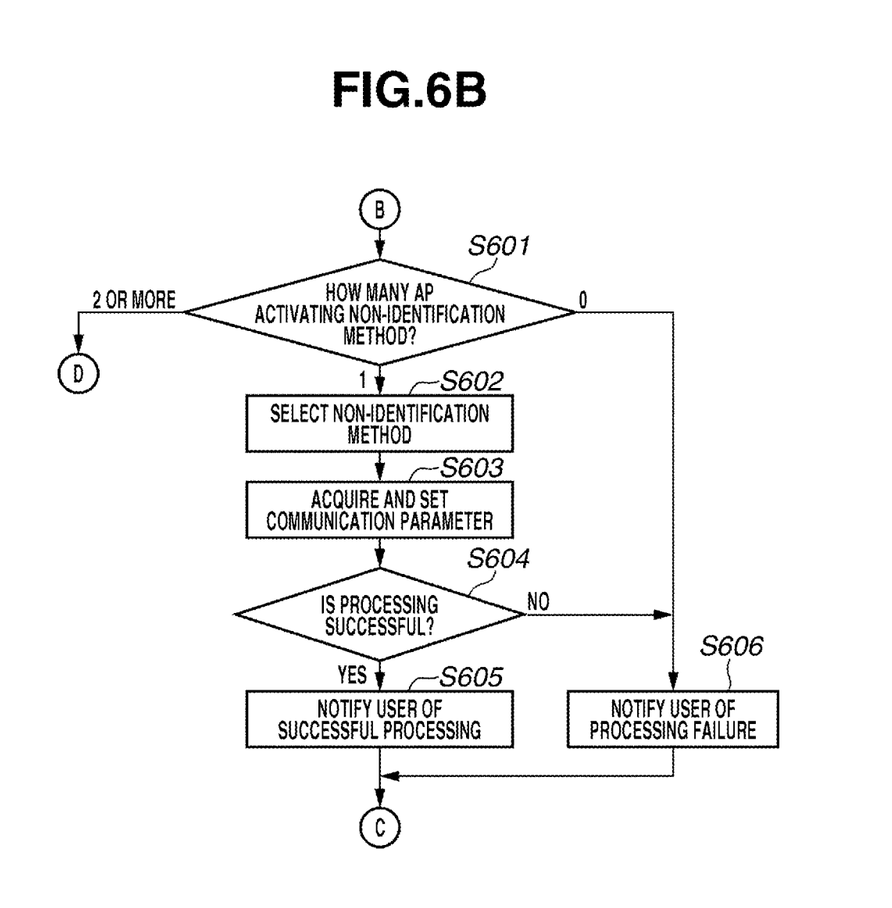

FIGS. 6A and 6B are a flowchart illustrating a process realized, when the user has pressed the setting button 205, by the control unit 201 in the communication apparatus 101 reading the computer program stored in the storing unit 202. Portions similar to those in the flowchart illustrated in FIG. 4 according to the first exemplary embodiment will be assigned the same numerals, and description will be omitted. According to the present exemplary embodiment, the identification method A is activated in the AP 102, and the non-identification method B is activated in the AP 103. The setting processing is not activating in the AP 104.

In step S401, if the user presses the setting button 205 in the communication apparatus 101 (YES in step S5401), the communication apparatus 101 transmits the probe request. The AP 102 and the AP 103 then transmit the probe response including the self information in response to the transmitted probe request. In step S402, upon receiving the probe response, the communication apparatus 101 acquires the information about the surrounding APs. In step S410, the communication apparatus 101 selects the identification method A activated in the AP 102 as the setting processing to be performed, based on the self information included in the received probe response.

Here, it is assumed that the communication apparatus 101 refers to the identification information input to the AP 102 and determines that the AP 102 is not the providing apparatus selected by the user (NO in step S414). Further, since the identification method A activated in the AP 102 is the only identification method, it is determined that the communication parameter acquisition has been tried for all of the providing apparatuses (YES in step S416).

The process thus proceeds to step S601. In step S601, the selection unit 307 determines the number of APs that are activating the non-identification methods. If the non-identification method is not activated in any of the APs (0 in step S601), the process proceeds to step S606. In step S606, the setting unit 301 notifies the user via the display unit 204 of the processing failure. The process in the flowchart illustrated in FIGS. 6A and 6B then ends.

The process may return to step S402 to perform the search process, and if the search unit 306 finds a newly activated setting method, the process may proceed to step S404. In such a case, if the newly activated setting method is not found even when a predetermined time has elapsed from the user pressing the setting button 205 in step S401, the display unit 204 notifies the user of the processing failure. The process in the flowchart illustrated in FIGS. 6A and 6B thus ends.

If the non-identification method is activated in a plurality of APs (2 or more in step S601), the process proceeds to step S411. In step S411, the setting unit 301 notifies the user via the display unit 204 of the error. The process in the flowchart illustrated in FIGS. 6A and 6B then ends.

If the non-identification method is activated in only one AP (1 in step S601), the process proceeds to step S602. In step S602, the selection unit 307 selects the non-identification method being activated. Since only the AP 103 is activated the non-identification method B, the selection unit 307 selects the non-identification method B. In step S603, the acquisition unit 305 uses the selected setting method (i.e., the non-identification method B) to acquire the communication parameter from the AP 103.

Then in step S604, the setting unit 301 confirms whether the communication parameters are acquired by the acquisition unit 305. If the acquisition is successful (YES in step S604), the process proceeds to step S605. In step S605, the setting unit 301 notifies the user via the display unit 204 that the processing is successful. Upon notifying the user, the process in the flowchart illustrated in FIGS. 6A and 6B ends. On the other hand, if the processing has failed (NO in step S604), the process proceeds to step S606. In step S606, the setting unit 301 notifies the user via the display unit 204 of the processing failure. The process in the flowchart illustrated in FIGS. 6A and 6B then ends.

As described above, the communication parameter automatic setting method can be automatically selected and performed without the user selecting the setting method, even when a plurality of communication parameter automatic setting systems is installed in the apparatus. User-friendliness is thus improved. According to the above-described exemplary embodiment, when the plurality of communication apparatuses in the vicinity is executing the communication parameter automatic setting system, the target apparatus determines whether to execute the communication parameter automatic setting system by itself based on a predetermined condition. Thus, the automatic setting processing can be appropriately performed according to the current environment, and the user-friendliness is improved.

According to the above-described exemplary embodiments, the AP is the providing apparatus that provides the communication parameters. However, the station may serve as the providing apparatus and provide the communication parameters to the other stations. Accordingly, the present invention may be applied even when the stations communicate with each other (e.g., in an ad hoc mode defined by IEEE).

Further, according to the first and second exemplary embodiments, when a plurality of the APs is activating the PIN method (i.e., the identification method) and the above-described other identification method (i.e., a method which causes the user to press the button on the AP twice), an arbitrary identification method is selected (i.e., in step S410 illustrated in FIG. 4). However, the selection is not limited to the above, and if the plurality of APs is activating the PIN method and the above-described other identification method, the PIN method may be preferentially selected. In such a case, if the setting processing by the PIN method fails, the setting processing by the other identification method is performed.

Accordingly, the setting processing by the PIN method is promptly performed without instructing the user to press the button in the AP again, so that user-friendliness is improved. Further, if the setting processing by the PIN method fails, i.e., in the case where the user does not intend to perform the setting processing by the PIN method, the other identification method is promptly activated. The setting processing can thus be performed without the user becoming conscious of the setting processing failure by employing the PIN method.

If the setting processing by the PIN method fails, the user may be notified thereof, and the setting processing may be ended. The complexity of notifying the user can thus be reduced.

If the plurality of APs is activating the PIN method and the above-described other identification method, the identification method other than the PIN method may be preferentially selected. If the setting processing by the other identification method then fails, the setting processing by the PIN method is activated. Accordingly, it becomes unnecessary to instruct the user who intends to perform the setting processing by the other identification method to input the PIN code, so that user friendliness is improved.

If the setting processing by the other identification method fails, the user may be notified thereof, and the setting processing may be ended. The complexity of notifying the user can thus be reduced.

Further, the process may be performed by regarding the above-described other identification method as the non-identification method. As a result, it can reduce the possibility of connecting an AP, which the user does not intend to connect to, with the communication apparatus 101 when the user presses the button in the AP for the second time.

Moreover, in step S408, if both the identification method and the non-identification method are detected, the identification method may be preferentially selected. Accordingly, it can be confirmed whether the apparatus detected by the communication apparatus 101 matches the apparatus that the user intended to connect to, so that the possibility of connecting to a different apparatus can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-136311 filed Jun. 15, 2010, which is hereby incorporated by reference herein in its entirety.

What is claimed is:

1. A communication apparatus capable of performing setting processing of a plurality of methods for sharing with other communication apparatuses communication parameters to be used in communication with the other communication apparatuses, the communication apparatus comprising:

a detection unit configured to detect a plurality of methods for setting processing activated in a plurality of apparatuses;

a determination unit configured to determine whether at least one of the plurality of methods for setting processing detected by the detection unit is an identification method for identifying an apparatus that provides the communication parameters based on a user operation after setting processing of the communication parameters is activated; and a selection unit configured to select, if the determination unit determines that at least one of the plurality of methods for setting processing detected by the detection unit is the identification method, the setting processing of the communication parameters by the identification method, wherein the identification method is a method in which a user inputs identification information to an apparatus that provides the communication parameters after the setting processing of the communication parameters is activated, and the apparatus in which the identification information is input notifies the communication apparatus of the identification information, so that the user identifies the apparatus that provides the communication parameters.

2. A non-transitory computer-readable storage medium for causing a computer to operate as a communication apparatus according to claim 1.

3. The communication apparatus according to claim 1, further comprising a termination unit configured to perform, if the determination unit determines that the identification method is not included in the plurality of methods for setting processing, error termination without performing setting processing of the communication parameters.

4. The communication apparatus according to claim 3, wherein, if the detection unit detects a plurality of the identification methods, the execution unit executes one setting processing among setting processing of the plurality of the detected identification methods, and if setting of the communication parameters by executing the setting processing fails, the execution unit executes other setting processing among setting processing of the plurality of identification methods.

5. The communication apparatus according to claim 4, further comprising a notification unit configured to notify a user of an error, if the determination unit determines that the identification method is not included in the plurality of methods for setting processing.

6. The communication apparatus according to claim 3, wherein, if the detection unit detects a plurality of the identification methods, the execution unit executes only one of setting processing of the identification method among the plurality of the detected identification methods.

7. The communication apparatus according to claim 3, further comprising a determining unit configured to determine, if the execution unit fails to set the communication parameters by executing setting processing of all of the identification methods detected by the detection unit, a number of apparatuses which are activating a non-identification method that is different from the identification method, wherein, if the determining unit determines that one apparatus is activating the non-identification method, the execution unit executes setting processing of the non-identification method.

8. A communication apparatus capable of performing setting processing of a plurality of methods for sharing with other communication apparatuses communication parameters to be used in communication with the other communication apparatuses, the communication apparatus comprising:

a detection unit configured to detect a plurality of methods for setting processing activated in a plurality of apparatuses;

a determination unit configured to determine whether at least one of the plurality of methods for setting processing detected by the detection unit is an identification method for identifying an apparatus that provides the communication parameters based on a user operation after setting processing of the communication parameters is activated;

a selection unit configured to select, if the determination unit determines that at least one of the plurality of methods for setting processing detected by the detection unit is the identification method, the setting processing of the communication parameters by the identification method; and an execution unit configured to execute setting processing for sharing the communication parameters with an apparatus which is activating setting processing of the identification method selected by the selection unit, wherein, if the detection unit detects a plurality of the identification methods, the execution unit executes one setting processing among setting processing of the plurality of the detected identification methods, and if setting of the communication parameters by executing the setting processing fails, the execution unit executes other setting processing among setting processing of the plurality of identification methods.

9. The communication apparatus according to claim 8, wherein, if the detection unit detects a plurality of the identification methods, the execution unit executes only one of setting processing of the identification method among the plurality of the detected identification methods.

10. The communication apparatus according to claim 8, further comprising a determining unit configured to determine, if the execution unit fails to set the communication parameters by executing setting processing of all of the identification methods detected by the detection unit, a number of apparatuses which are activating a non-identification method that is different from the identification method, wherein, if the determining unit determines that one apparatus is activating the non-identification method, the execution unit executes setting processing of the non-identification method.

11. The communication apparatus according to claim 8, wherein, if the detection unit detects one apparatus that is activating setting processing of the communication parameters, the selection unit selects setting processing of one method among setting processing activated in the apparatus executing the setting processing.

12. The communication apparatus according to claim 8, wherein the identification method is a method in which a user presses a predetermined button on an apparatus that provides the communication parameters after the setting processing of the communication parameters is activated, and the apparatus notifies the communication apparatus of the user pressing the predetermined button, so that the user identifies the apparatus that provides the communication parameters.

13. The communication apparatus according to claim 8, further comprising a termination unit configured to perform, if the determination unit determines that the identification method is not included in the plurality of methods for setting processing, error termination without performing setting processing of the communication parameters.

14. A communication apparatus capable of performing setting processing of a plurality of methods for sharing with other communication apparatuses communication parameters to be used in communication with the other communication apparatuses, the communication apparatus comprising:

a detection unit configured to detect a plurality of methods for setting processing activated in a plurality of apparatuses;

a determination unit configured to determine whether at least one of the plurality of methods for setting processing detected by the detection unit is an identification method for identifying an apparatus that provides the communication parameters based on a user operation after setting processing of the communication parameters is activated;

a selection unit configured to select, if the determination unit determines that at least one of the plurality of methods for setting processing detected by the detection unit is the identification method, the setting processing of the communication parameters by the identification method; and a termination unit configured to perform, if the determination unit determines that the identification method is not included in the plurality of methods for setting processing, error termination without performing setting processing of the communication parameters.

15. The communication apparatus according to claim 14, wherein the identification method is a method in which a user presses a predetermined button on an apparatus that provides the communication parameters after the setting processing of the communication parameters is activated, and the apparatus notifies the communication apparatus of the user pressing the predetermined button, so that the user identifies the apparatus that provides the communication parameters.

16. The communication apparatus according to claim 14, further comprising an execution unit configured to execute setting processing for sharing the communication parameters with an apparatus which is activating setting processing of the identification method selected by the selection unit.

17. The communication apparatus according to claim 16, further comprising a notification unit configured to notify a user of an error, if the determination unit determines that the identification method is not included in the plurality of methods for setting processing.

18. The communication apparatus according to claim 14, further comprising a notification unit configured to notify a user of an error, if the determination unit determines that the identification method is not included in the plurality of methods for setting processing.

19. The communication apparatus according to claim 14, wherein, if the detection unit detects one apparatus that is activating setting processing of the communication parameters, the selection unit selects setting processing of one method among setting processing activated in the apparatus executing the setting processing.

20. The communication apparatus according to claim 14, further comprising
a determining unit configured to determine, if the execution unit fails to set the communication parameters by executing setting processing of all of the identification methods detected by the detection unit, a number of apparatuses which are activating a non-identification method that is different from the identification method,
wherein, if the determining unit determines that one apparatus is activating the non-identification method, the execution unit executes setting processing of the non-identification method.

21. The communication apparatus according to claim 20, wherein, if the detection unit detects a plurality of the identification methods, the execution unit executes only one of setting processing of the identification method among the plurality of the detected identification methods.

22. A method for controlling a communication apparatus capable of performing setting processing of a plurality of methods for sharing with other communication apparatuses communication parameters to be used in communication with the other communication apparatuses, the method comprising:
detecting a plurality of methods for setting processing activating in a plurality of other apparatuses;
determining whether at least one of the plurality of detected methods for setting processing is an identification method for identifying another apparatus that provides the communication parameters based on a user operation after setting processing of the communication parameters is activated; and
selecting, if at least one of the plurality of detected methods for setting processing detected is determined as the identification method, the setting processing of the communication parameters by the identification method,
wherein the identification method is a method in which a user inputs identification information to an apparatus that provides the communication parameters after the setting processing of the communication parameters is activated, and the apparatus in which the identification information is input notifies the communication apparatus of the identification information, so that the user identifies the apparatus that provides the communication parameters.

23. A method for a communication apparatus capable of performing setting processing of a plurality of methods for sharing with other communication apparatuses communication parameters to be used in communication with the other communication apparatuses, the method comprising:
detecting a plurality of methods for setting processing activated in a plurality of apparatuses;
determining whether at least one of the plurality of methods for setting processing detected by the detecting is an identification method for identifying an apparatus that provides the communication parameters based on a user operation after setting processing of the communication parameters is activated;
selecting, if the determining determines that at least one of the plurality of methods for setting processing is the identification method, the setting processing of the communication parameters by the identification method; and
executing setting processing for sharing the communication parameters with an apparatus which is activating setting processing of the identification method selected by the selecting,
wherein, if the detecting detects a plurality of the identification methods, the executing executes one setting processing among setting processing of the plurality of the detected identification methods, and if setting of the communication parameters by executing the setting processing fails, the executing executes other setting processing among setting processing of the plurality of identification methods.

24. A method for a communication apparatus capable of performing setting processing of a plurality of methods for sharing with other communication apparatuses communication parameters to be used in communication with the other communication apparatuses, the method comprising:
detecting a plurality of methods for setting processing activated in a plurality of apparatuses;
determining whether at least one of the plurality of methods for setting processing is an identification method for identifying an apparatus that provides the communication parameters based on a user operation after setting processing of the communication parameters is activated;
selecting, if the determining determines that at least one of the plurality of methods for setting processing is the identification method, the setting processing of the communication parameters by the identification method; and
performing, if the determining determines that the identification method is not included in the plurality of methods for setting processing, error termination without performing setting processing of the communication parameters.

* * * * *